United States Patent [19]

Fujita et al.

[11] Patent Number: 5,402,349
[45] Date of Patent: Mar. 28, 1995

[54] SYSTEM FOR FORMING AUTOMATIC PRODUCTION LINE CONTROL DATA

[75] Inventors: Satoru Fujita; Sadami Ouchi; Masahiro Ohnami, all of Hyogo, Japan

[73] Assignee: Mitsubishi Denki Kabushiki Kaisha, Tokyo, Japan

[21] Appl. No.: 897,942

[22] Filed: Jun. 15, 1992

[30] Foreign Application Priority Data

Jun. 20, 1991 [JP] Japan .................................. 3-176043

[51] Int. Cl.$^6$ ............................................ G06F 15/46
[52] U.S. Cl. .................................. 364/468; 364/191; 395/904
[58] Field of Search ............................. 364/191–193, 364/401, 403, 468–479; 395/902–904, 906, 919, 922, 923

[56] References Cited

U.S. PATENT DOCUMENTS

| | | | |
|---|---|---|---|
| 4,736,306 | 4/1988 | Christensen et al. | 364/191 |
| 4,998,206 | 3/1991 | Jones et al. | 364/468 |
| 5,033,014 | 7/1991 | Carver et al. | 364/474.24 |
| 5,093,794 | 3/1992 | Howie et al. | 364/468 |
| 5,249,135 | 9/1993 | Fujita | 364/474.21 |

FOREIGN PATENT DOCUMENTS 2-15949  1/1990  Japan .

OTHER PUBLICATIONS

"Intellectualization and Integration for Next Generation CAD/CAM System", published by Mitsubishi Electric Corp., Japanese Mechanical Society No. 910-37, Collected Symposium Lecture Monographs, Jun. 26-29, 1991, Japan, pp. 261-264.

D. Guo et al., "Object Oriented Flexible Manufacturing System Simulation", University of Calgary, pp. 225-230, 1990.

Primary Examiner—Roy N. Envall, Jr.
Assistant Examiner—Steven R. Garland
Attorney, Agent, or Firm—Burns, Doane, Swecker & Mathis

[57] ABSTRACT

An automatic production line control data forming system for use in a production design, control and preparation system for a production line comprising: a process planning system for inputting data such as configurations and tolerances which are provided on drawings, and performing a process planning operation with reference to production machine data; a production scheduling system for making day's schedule plans; and an automatic programming system for forming programs for production machines such as NC machine tools and robots. In the automatic production line control data forming system, configuration data and machining features of parts which have been formed during process planning are subjected to formal conversion and transmitted to the automatic programming system, to allow the automatic programming system to form NC programs; or the kinds, the numbers and the delivery dates of parts to be manufactured during a given period which are provided as an article production plan, and data on production machines for machining the parts and machining time therefor which are formed during process planning are subjected to formal conversion and transmitted to the production scheduling system, to allow the production scheduling system to form day's schedule plans.

9 Claims, 7 Drawing Sheets

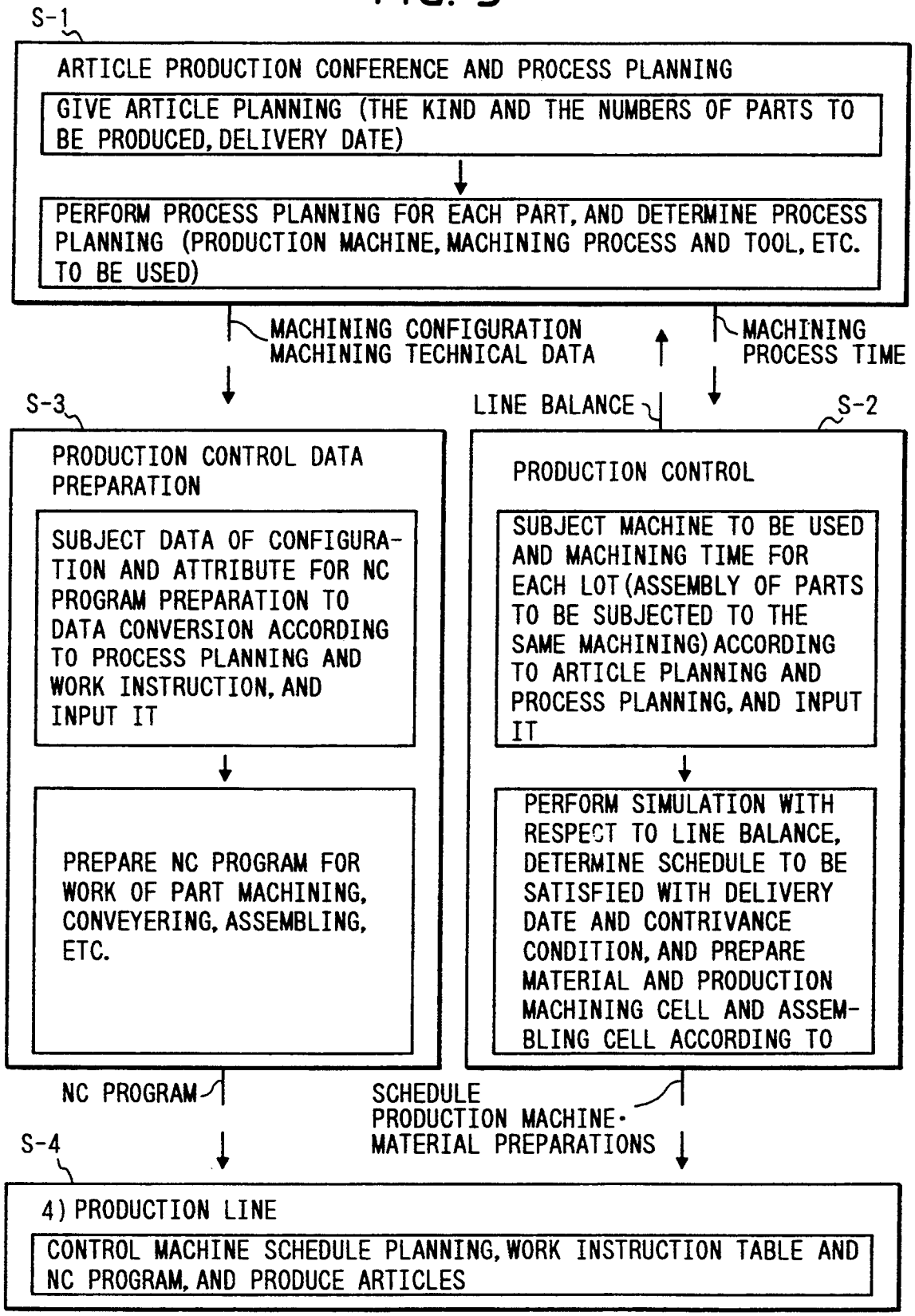

FIG. 4(a)

```
REPEAT PROCESS NUMBERS              // PROCESS SEQUENCE LOOP
PROCESS ( i )
PROCESS NAME      ::= <string>                                    ......(1)
INSTRUCTION       ::= <string>                                    ......(1)
MACHINE NAME      ::= <string (SUBSTITUTE MACHINE LIST)>
MATERIAL NAME     ::= <type X Y Z>
REPEAT OPERATION NUMBERS            // OPERATION SEQUENCE LOOP
OPERATION ( j )
POSE              ::= <CONVERSION MATRIX, INDEX ANGLE>
FIXING INSTRUCTION ::= <string>
FIXING TIME       ::= <NATURAL NUMBER>
REPEAT MACHINING NUMBERS            // MACHINING SEQUENCE LOOP
MACHINING ( k )
MACHINING TIME              ::= <REAL NUMBER>                     ......(1)
MACHINING UNIT              ::= <MF (ATTRIBUTE)>                  ⎫
MACHINING COORDINATES       ::= <CONVERSION MATRIX>               ⎪
TOOL SEQUENCE               ::= <type NOMINAL DIAMETER ATTRIBUTE> ⎬ (2)
CONFIGURATION ELEMENT NUMBERS ::= <NATURAL NUMBER>                ⎪
CONFIGURATION SEQUENCE      ::= <type (X Y Z)|(X Y Z R I J)>      ⎭
    :
END MS
    :
END OS
    :
END PS
```

FIG. 4(b)

```
type::= < FC=11 | FCD=12 | S45C=13 | SCM=14 | SUS=15 | AL=16 | CU=17 >
MF  ::= < OpenFace=20 | Face=21 | Pocket=22 | Groove=23 | Drill =24 | Tap=25 >
TOOL TYPE        ::= < Facemill= 0 | Endmill= 1 >
TOOL ATTRIBUTE   ::= < A | B | C >
CONFIGURATION type::::= < Line= 0 | cwArc= 1 | ccwArc=2 > ex > MACHINE UNIT ATTRIBUTE
MACHINING ATTRIBUTE ::= < OpenFace | Face | Pocket | Groove
                          DEPTH BLANK Z BOTTOM V WALL V  FINISHING Z  FINISHING R >
                    ::= < DRILL  HOLE DIAMETER  HOLE DEPTH  CHAMFERING >
                    ::= < TAP  NOMINAL  OUTER CONFIGURATION  PITCH  SCREW DEPTH  CHAMFERING >
```

FIG. 5

```
C A P E S - P  PROCESS PLANNING OUTPUT SAMPLE
       10              /* PROCESS NUMBERS */
       PROCESS 1
// twp-1 al-a5052p-h112 Process-Number1 vml-004
       vml-004 (vml-006 vml-009 vml-016 vml-017)
       16 220.0 170.0 40.0
       10              /* OPERATION NUMBERS */
       OPERATION 1
       30.0 30.0 30.0  /* FIXING POSE DATA */
       300000.0        /* SET-UP TIME */
// comment about machining sequence
       10              /* MACHINING NUMBERS */
       MACHINING 1
       20 0.0 10.0 2 -1 -1.0 -1.0
 /* OpenFace DEPTH  BLANK Z  BOTTOM  WALL  FINISHING Z
             FINISHING R */
       100000.0        /* MACHINING TIME 1 */
       0 20 A          /* FACE MILL 20 A */
       4               /* CONFIGURATION SEQUENCE COUNT */
       0 0.0    0.0   0.0      /* Line X=0.0   Y=0.0    Z=0.0 */
       0 0.0    150.0 0.0      /* Line X=0.0   Y=150.0  Z=0.0 */
       0 200.0  150.0 0.0      /* Line X=200.0 Y=150.0  Z=0.0 */
       0 200.0  0.0   0.0      /* Line X=200.0 Y=0.0    Z=0.0 */
       1 0.0 10.0 2 2 1.0 1.0
 /* Face DEPTH  BLANK Z  BOTTOM  WALL  FINISHING Z  FINISHING R */
       200000.0        /* MACHINING TIME 2 */
       1 20 A          /* END MILL 20 A */
       4               /* CONFIGURATION SEQUENCE COUNT */
       0 0.0    0.0   0.0      /* Line X=0.0   Y=0.0    Z=0.0 */
       0 0.0    150.0 0.0      /* Line X=0.0   Y=150.0  Z=0.0 */
       0 200.0  150.0 0.0      /* Line X=200.0 Y=150.0  Z=0.0 */
       0 200.0  0.0   0.0      /* Line X=200.0 Y=0.0    Z=0.0 */
```

SYSTEM FOR FORMING AUTOMATIC PRODUCTION LINE CONTROL DATA

BACKGROUND OF THE INVENTION

1. Field of the Invention

This invention relates to an automatic production line control data forming system in which, in production control (production line scheduling) of a production line equipped with machine tools and industrial robots, or in an automatic programing system for production machines such as machine tools and industrial robots, a computer reuses data on the results of processing provided by a process designing system or data on the results of intermediate processing, thereby to form at least one day's schedule plans and NC (numerical control) automatic programs with high efficiency.

2. Prior Art

FIG. 6 is a diagram showing the arrangement of a conventional production system. In FIG. 6, reference numeral 10 designates a process planning system for determining the order of use of production machines, jigs and tools according to drawings provided for parts to be manufactured; 50, a production machine file which is referred to for process planning; 19, a process and work know-how file for determining the order of processes or operations; 20, a production line scheduling system for forming at least one day's schedule plans according to an article producing plan; 28, a machining time file in which the machining time for each of the machining processes provided for parts to be manufactured is stored; and 29, a scheduling know-how file in which know-how as to the schedule plans for each of the days are stored.

Further in FIG. 6, reference numeral 60 designates a production instruction manual revealing the contents of machining, assembling and preparing operations which are finally determined according to process plans and the schedule plans for each of the days; 30, a production preparation supporting system for preparing concrete production data, the system 30 comprising an NC (numerical control) automatic programming system for supporting the formation of NC programs, an automatic programming system for supporting the formation of robot control programs, and an arrangement system for supporting the preparation of materials, jigs, etc.; and 40, a production line on which parts are machined and assembled. The production line 40 is made up of machining cells 41 and 42 including mainly machine tools, and an assembling cell 43 including mainly robots and assembling machines.

The production line shown in FIG. 6 is of a large scale, and its operation is considerably intricate. Hereunder, the functions and operations of the production line will be described with reference mainly to machining operations. Upon completion of an article designing operation, article data such as drawings are handed to the manufacture department, where responsible persons in an article designing section, in a production planning section, and in a production control section hold meetings to study articles to be manufactured, and the delivery dates and the number of the articles, and have discussions about problems which may be involved in process planning, production control, and manufacturing, thereby to roughly determine production activities such as procurement of materials and countermeasures against bottle-neck problems.

Thereafter, the production data are gradually detailed as follows. First, a process planner performs a process planning operation by using the process planning system 10 according to given part drawings, to select production machines to be used for manufacture of the parts, and determine the order in which the selected machines are to be used, and also to select mounting appliances and tools and determine the order in which the selected mounting appliances and tools are to be used. If, in this case, the same part has been manufactured before, then the process planner refers to the processes previously employed for that part. Furthermore, in determination of the processes, reference is made to the production machine file 50 and the process and work know-how file 19. The process planner considers, according to the part drawings provided by the designer, the configurations of intermediate parts which should be formed to reach the aimed part, and makes so-called "machining drawings" for the intermediate parts. The machining drawings include data on preparing operations and machining operations in all the machining processes. The above-described process planning operation is carried out for each of the parts of the article.

Next, the production controller, while taking the kinds of parts to be manufactured, the number of each of the parts and the delivery data thereof, production machines (such a machine tools and jigs) used to manufacture the parts determined by the planning of processes, and periods of time required for the manufacturing processes (such as machining, conveying and assembling processes) into account, makes a rough plan for every one or six months, and uses the production scheduling system 20 to perform a scheduling operation, to concretely determine the days' schedule plans for a certain period. In each of the day's schedule plans, as for each of the parts of an article to be manufactured, it is determined who will operate what machine in what machining processes. In this case, reference is made to the machining time file 28 to detect periods of time required for the machining processes, and to the schedule know-how file for elimination of the difficulty that the line balance is poor.

Thus, a document 60 concerning work instructions, assignment of persons, and NC program preparation for machining and assembling operations is formed according to the process plans and the production schedules for a certain period. Production preparations are started in accordance with this production instruction manual. Programs for the NC machine tools, robots, etc. are formed by using a CAM (automatic programming) system 30. As for the materials, mounting appliance and tools, a procedure is taken to procure them if they are not available. These preparatory operations are achieved before the production starts. A work instruction table, assignment of persons, NC programs, etc. which are determined by the process planning operation, scheduling operation, and production preparation are handed to the production line 40 including the machining cells 41 and 42 and the assembling cell 43, to start the production.

In the formation of control data for the conventional production line, the results (or data) of process planning and scheduling operations cannot be reused for other work, and accordingly the frequency of reinputting data is increased, which lowers the productivity. One of the reasons for this; is that the process planning operation, the production scheduling operation, and the production preparation are highly technical, and another is that a number of persons must work sharing manufacturing operations, and therefore the production is partially computer-aided. Furthermore, the transmission of information between organizations in the factory is carried out with documents such as work instruction tables, machining drawings and Gantt charts which are standardized in that factory.

For instance, one of the outputs of the processing planning operation is machining drawings which specify configurations of parts to be formed and portions of the parts to be machined. In the processing planning operation, part drawings are employed as input data; however, those part drawings are not processed by the computer, or, in many cases, they are not used as output data even when they are processed by the computer. Furthermore, the machining drawings are handed, in the form of paper drawings, for a production preparation performed downstream of the production line, and therefore in formation of NC programs, the machining drawings cannot be used as data by the computer, and data may be inputted with error.

Thus, there has been a demand for provision of a system in which, in the initial process planning step of a production activity, a model necessary for the production is defined, and it is converted into data which are required for production control and production preparation according to the intermediate data or results which-are obtained from information inputted, so that the data can be reused.

SUMMARY OF THE INVENTION

Accordingly, an object of this invention is to eliminate the above-described difficulties accompanying a conventional production system.

More specifically, an object of the invention is to express inputs, and data and results of intermediate processing in upstream process planning operations for a production activity so that they can be readily converted into data which are necessary for production preparation supporting systems such as a production scheduling system and an NC automatic programming system, and production scheduling operations and production information preparations are consolidated together according to the results of the process planning operation, so that control operation programs for a production line are formed with high efficiency.

According to a first aspect of the invention, there is provided, in a production design, control and preparation system for a production line comprising: a process planning system for inputting data such as configurations and tolerances which are provided on drawings, and performing a process planning operation with reference to production machine data; a production scheduling system for making a day's schedule plans; and an automatic programming system for forming programs for production machines such as NC machine tools and robots, an automatic production line control data forming system in which configuration data and machining features of parts which have been formed during process planning are subjected to formal conversion and transmitted to the automatic programming system, to allow the automatic programming system to form NC programs.

In the system, the configuration data and machining features of parts which have been formed during process planning are converted into data on configurations and attributes for formation of NC programs in the automatic programming system to form NC programs. This will eliminate the manual data inputting operation which is rather troublesome.

According to a second aspect of the invention, there is provided, in a production design, control and preparation system for a production line comprising: a process planning system for inputting data such as configurations and tolerances which are provided on drawings, and performing a process planning operation with reference to production machine data; a production scheduling system for making at least one day's schedule plans; and an automatic programming system for forming programs for production machines such as NC machine tools and robots, an automatic production line control data forming system in which the kinds, the numbers and the delivery dates of parts to be manufactured during a given period which are provided as an article production plan, and data on production machines for machining the parts and machining time therefor are subjected to formal conversion and transmitted to the production scheduling system, to allow the production scheduling system to form at least one day's schedule plans.

In the system according to the second aspect of the invention, the kinds, the numbers and the delivery dates of parts to be manufactured during a given period which are provided as an article production plan, and data on production machines for machining the parts and machining time therefor are utilized to form the days' schedule plans. This will eliminate a difficulty that a plurality of parts compete with each other for use of a production machine.

According to a third aspect of the invention, in any one of the above-described automatic production line control data forming systems, the kinds, the numbers and the delivery dates of parts to be manufactured during a given period which are provided as an article production plan, and data on production machines for machining the parts and machining time therefor are subjected to formal conversion and transmitted to the production scheduling system, to allow the production scheduling system to form the days' schedule plans, and when a desired line balance is reached, data on production machines for machining parts which have been determined thereby are subjected to formal conversion and transmitted to the automatic programming system, to allow the automatic programming system to form NC programs.

In the system according to the third aspect, as was described above, the kinds, the numbers and the delivery dates of parts to be manufactured during a given period which are provided as an article production plan, and data on production machines for machining the parts and machining time therefor are subjected to formal conversion and transmitted to the production scheduling system, to form the days' schedule plans, and when a desired line balance is reached, data on production machines for machining parts which have been determined thereby are subjected to formal conversion to form automatic programs. Hence, production of articles is started on the production line according to a production schedule.

The nature, utility and principle of the invention will be more clearly understood from the following detailed description and the appended claims when read in conjunction with the accompanying drawings.

BRIEF DESCRIPTION OF THE DRAWINGS

In the accompanying drawings:

FIG. 3 is a flow chart showing operations in the production system in the embodiment of the invention;

FIG. 4(a) is an explanatory diagram showing the arrangement of data in a process plan;

FIG. 4(b) is also an explanatory diagram showing the definitions of attribute type data;

FIG. 5 is an explanatory diagram showing a concrete example of a process plan output in the embodiment of the invention.

DETAILED DESCRIPTION OF THE PREFERRED EMBODIMENTS

One preferred embodiment of this invention will be described with reference to FIGS. 1 and 2.

Figure 1:
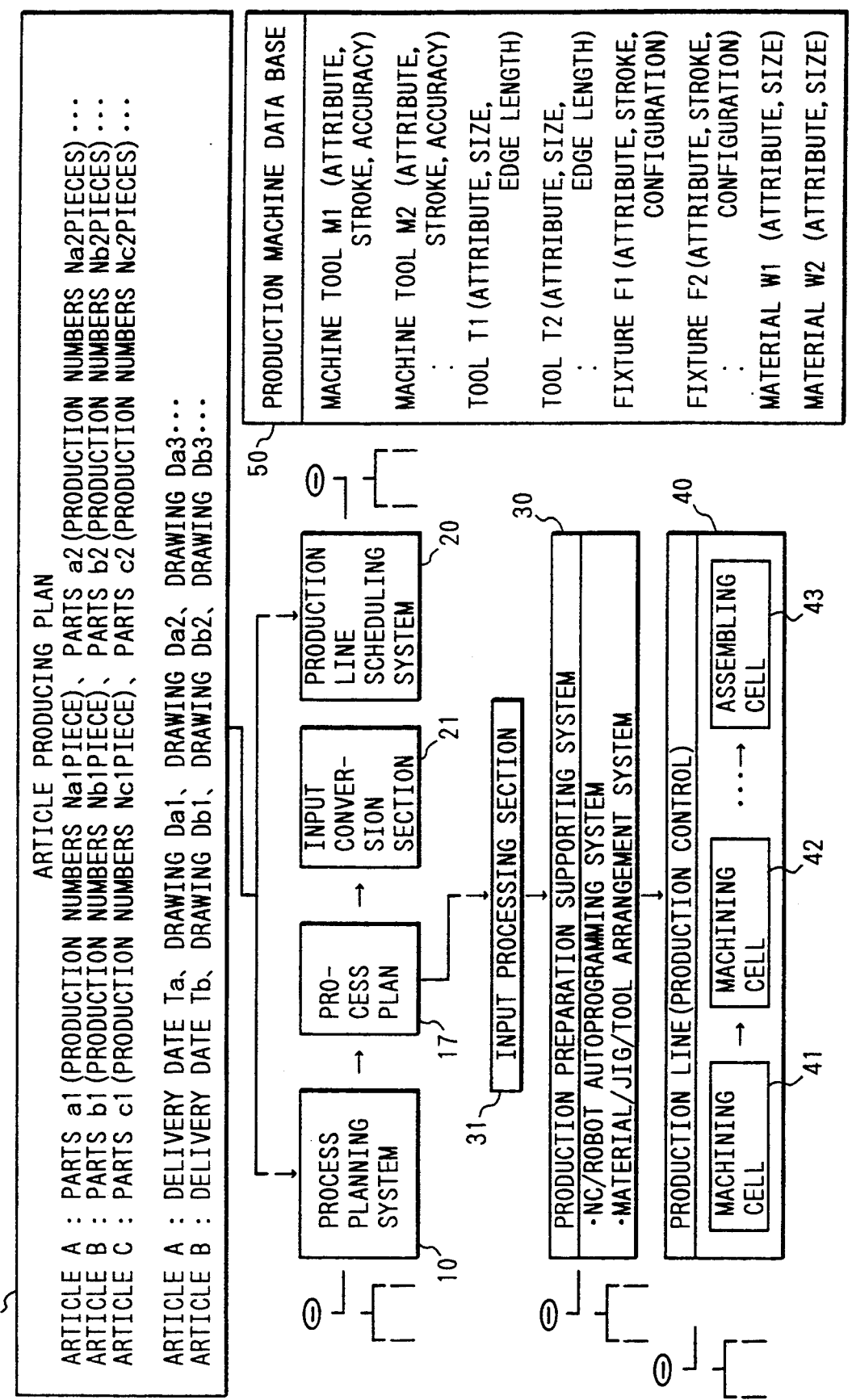
FIG. 1 is an explanatory diagram showing the arrangement of a production system in one embodiment of this invention.

In FIG. 1, reference numeral 1 designates an article producing plan given to a production department from a management and design department, the article producing plan 1 including drawings for articles and their parts to be manufactured, and the numbers and delivery dates thereof; and 10, a process planning system which plans processes according to given part drawings, and selects production machines to be used and determines the order in which the production machines are to be used, and selects select jigs and tools to be used and determines the order in which the selected jigs and tools are to be used, and determines parts to be machined and the order in which the parts are to be machined, thereby to provide a process plan 17.

Figure 2:
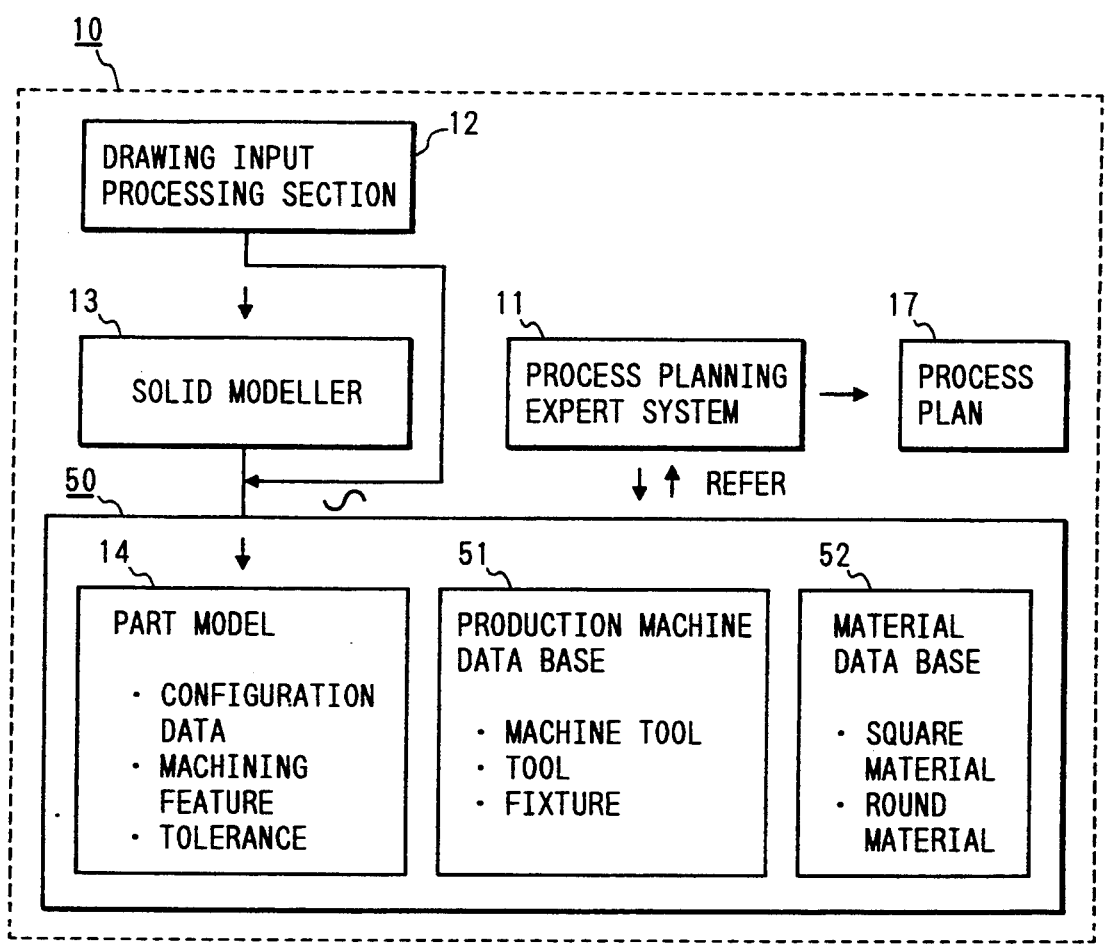
FIG. 2 is a block diagram showing a process planning system in the embodiment of the invention in detail.
Figure 6:
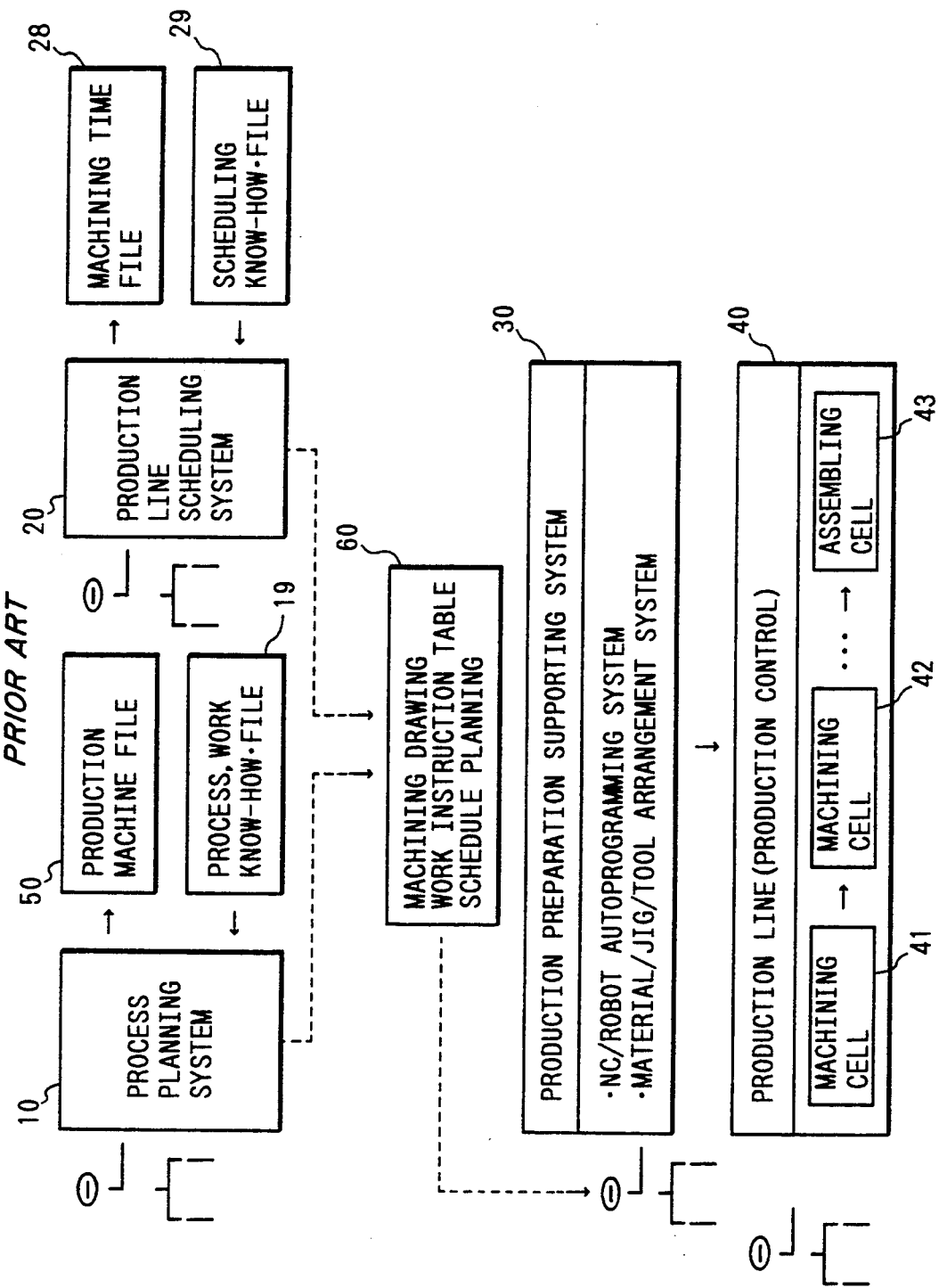
FIG. 6 is an explanatory diagram showing the arrangement of a conventional production system.

FIG. 2 shows the above-described process planning system 10 in detail. In FIG. 2, reference numeral 12 designates a drawing inputting section for processing part drawings to form part models on a computer; 13, a solid modeller for forming configuration data of the part models; 51 and 52, data bases concerning production machines and materials which have been stored in the computer; 11, a process planning expert system which, according to part drawings inputted, uses production knowledge to determine process plans; and 17, the process plans thus determined.

Referring back to FIG. 1, reference numeral 20 designates a production line scheduling system for forming a schedule for a given period according to article production plans and process plans; 21, an input conversion section which refers to article production plan and process plan data, to select and convert input data necessary for scheduling; 30, a production preparation supporting system which, according to the process plans and the day's schedule plans, forms NC programs and prepares materials, jigs and tools; 31, an input processing section which refers to the process plan and day's schedule plan data, to select and convert input data necessary for production preparation; 40, a production line which actually performs manufacturing operations for a given period according to the data which have been designed and planned by the aforementioned steps of process planning, production control, and production preparation, the production line 40 including machining cells 41 and 42 and an assembling cell 43; and 50, a production machine data base which is referred to when data are designed and planned in the steps of process planning, production control, and production preparation.

The operation of the production system thus organized will be described. In this connection, a system for handling process plans will be described as far as concerns the invention only, because it has been disclosed by the preceding Patent Application (Japanese Patent Application No. 166203/1988, entitled "Process Design Processing System", filed by Fujita).

According to a text book, the term "process planning" means an operation that, according to article drawings and part drawings received from a designing section, process planning, mounting appliance planning, and work planning are performed, to determine all data necessary for manufacturing articles which, for instance, includes production machines and mounting appliances to be used and the order of in which they are to be used. However, in practice, process planning is not univocal. In this case, an NC automatic programming system is employed for the final work planning step of forming NC programs including cutting conditions, and a process planning system is used mainly for process planning and mounting appliance planning.

After articles to be manufactured for a given period have been designed, technical data such as the delivery dates and the numbers of the articles, and drawings for the parts forming the articles are given, as the article production plan 1, to the production department. FIG. 3 shows a flow of process in a production system according to the invention. The flow of process is considerably intricate; however, for simplification in description, only main flows of process (S-1) through (S-4) will be described hereunder.

(S-1)

Responsible persons in the article designing section, the production planning section, and the production control section hold meetings, to study articles to be manufactured, and the delivery dates and numbers thereof according to given designs and sales plans, and to debate problems involved in the process plan, production control, and manufacture. And, a production plan is outlined which, for instance, includes the procurement of materials, internal/external manufacturing, and the countermeasures against bottleneck processes.

In accordance with this policy, first a process planning operation is carried out by the process planning expert system shown in FIG. 2. Drawing data are inputted in an interaction mode by the part model drawing inputting section 12. The term "part model 14" as used herein is intended to mean configuration data indicated by drawings, machining features representing features of parts such as faces, pockets and holes to be machined (corresponding to "Machining Mode" in the previous Japanese Patent Application No. 166203/1988), and tolerance data such as tolerance, flatness, and surface roughness. Of those data, the configuration data are applied to the solid modeller 13, so that three-dimensional configuration data are formed on the computer. The other data are stored in the computer in such a manner that they are linked with the configuration data.

Thereafter, the process planning expert system is started. That is, reference is made to the part model and to the data base such as production machines and materials available in the factory which has been stored in advance, to process rules representing process planning knowledge, to determine a process plan 17.

In the system of the invention, the process plan is as shown in FIG. 4(a). That is, it includes a process sequence in which a material or materials are processed to manufacture a part, an arrangement sequence, or operation sequence, in which machine tools are set up with mounting appliances; and a machining sequence in which machining operations are carried out with the machine tools thus set. Attribute and type data are as defined in FIG. 4(b). FIG. 5 shows one example of a concrete process plan.

The above-described process planning operation is carried out for all of the parts. In the case where many different parts are to be manufactured, a variety of parts are processed on the production line. In practice, a plurality of parts flow along the production line. If two parts reach a machine tool at the same time, then they will compete with each other for use of the machine tool. In the process planning operation, such a dynamic condition is not taken into account; that is, the process planning operation is effected with the static condition of each of the parts taken into account. The above-described difficulty that parts compete with each other for use of a machine tool is handled by the scheduling system.

(S-2)

In general, the manufacture is carried out every lot. Therefore, in the scheduling system, each lot is defined by a job. The job is expressed by the number and the delivery date of parts, machining process/machine tools to be employed, and machining time.

The machining process/machine tool to be employed, and the machining time are obtained from the results of the process planning operation (1 in FIG. 4(a)).

Machining process/machine tool←process name/machine name

Machining time←(unitary machining time)×(number of parts)/(number of parts per lot)

As for the machining time, a rough value is obtained from a volume of removal done by the process planning system, or estimation is made according to the past actual data. Alternatively, the following method may be employed. After an NC program is formed during the production preparation carried out downstream of the line, a tool path check is performed to estimate machining time. The machining time thus estimated is fed back. The number and the delivery date of parts are data given as article production plan data at the beginning. In production line scheduling system, its inputting section operates to automatically take data out of the process plan for the former and out of the article production plan for the latter, and convert them when necessary.

When data for all jobs for a given period have been inputted, simulation for line balance is carried out for each day. The operator studies the results of simulation (Gantt chart), and repeats the simulation while changing a dispatching rule until the delivery dates of the jobs and the starting conditions are satisfied. Thus, in the production scheduling system in which the days' schedule plans are determined by trial and error, the simulation is carried out with a premise that a plurality of parts flow in the production line. Therefore, although the simulation is performed on the computer, its result is dynamic. That is, the above-described problem that parts compete with each other for use of a machine tool is solved by the scheduling system. This result is utilized to arrange necessary materials, and production machines such as machine tools, jigs and tools.

(S-3)

The process plan and the day's schedule plan are utilized to determine a concrete plan for each of the days of the production period. Thereafter, the operator uses the production preparation supporting system to form NC programs for controlling the production machines.

An NC program for a machine tool includes machining attributes (machining features, machine coordinate system, tools, and cutting conditions) and machining region configurations. The inputting section reads those data out of the process plan, and modifies them when necessary, thus obtaining input data automatically. The operator inputs the remaining data, to accomplish the formation of the NC program, and then performs a tool path check on the computer, to determine whether or not the program is correct.

In the conventional system, the process plans and the day's schedule plans are indicated by using paper documents, drawings, etc., and therefore the operator is forced to input data through the keyboard with the machine coordinate system taken into account while referring to the machining drawings. On the other hand, in the system of the invention, those data can be obtained from the part models or the results of process planning with the aid of a computer (cf. 2 in FIG. 4(a)). This will greatly reduce the frequency of data reinputting operations, and the number of errors in inputting data.

(S-4)

Thus, all preparatory operations necessary for manufacture are accomplished by the above-described operations according to the flows of process (S-1) through (S-3). The day's schedule plans, the work instruction tables, and NC programs are delivered to line operators and to the machining cells. Thus, the manufacture of the articles on the production line is started.

In the above-described embodiment, of the manufacturing operations, the machining operation is selected for a description of the processing system; however, it should be noted that the invention is not limited thereto or thereby. That is, the technical concept of the invention may be applied to other manufacturing operations.

In the system according to the first aspect of the invention, as was described above, the configuration data and machining features of parts which have been formed during process planning are subjected to formal conversion and transmitted to the automatic programming system to allow the latter to form NC programs. This will greatly reduce the frequency of data reinputting operations, and the number of errors in inputting data.

In the system according to the second aspect of the invention, as was described above, the kinds, the numbers and the delivery dates of parts to be manufactured during a given period which are provided as an article production plan, and data on production machines for machining the parts and machining time therefor are subjected to formal conversion and transmitted to the production scheduling system, to allow the latter to form days' schedule plans. This will eliminate a difficulty that, even in the case where it is required to manufacture a number of different parts, a plurality of parts compete with one another for use of a production machine. That is, the production machine is operated with high efficiency.

In the system according to the third aspect of the invention, process plans formed during process planning, and day's schedule plans formed by the production scheduling system are utilized to form a concrete plan for each day, and thereafter the production preparation supporting system is used to form NC programs for controlling the production machines. Hence, the production system is high in efficiency in which the frequency of data reinputting operations, and the number of errors in inputting data are greatly reduced, and production of articles on the production line can be started according to the production schedule.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. An automatic production line control dam forming system for use in a production, design, control and preparation system for a production line, said system comprising:
   a process planning system for inputting an article producing plan and for performing a process planning operation in accordance with said input article producing plan, said process planning system including:
   a drawing inputting section for processing part drawings provided in said article producing plan to form part models;
   a solid modeler for forming three-dimensional configuration data;
   memory means for storing databases concerning production machines and materials; and
   a process planning expert system, responsive to said part drawings, said configuration data, and said memory means for determining said process plan;
   a production scheduling system for forming a schedule for a given period of time in accordance with said article producing plan and said process plan;
   an automatic programming system for forming programs for production machines; and
   means for converting configuration data and predetermined information provided in said process plan into a format suitable for use by said automatic programming system, and transmitting said converted data to said automatic programming system, wherein said automatic programming system uses said converted data received from said means for converting to form said programs.

2. The system according to claim 1, wherein said production machines comprise numerical controlled machine tools and robots.

3. The system according to claim 1, wherein said article producing plan comprises data representing configurations and tolerances provided on drawings of articles to be produced.

4. The system according to claim 1, further comprising:
   means for converting data representing kinds, numbers and delivery dates of parts to be manufactured during a given period which data is part of said article producing plan, and data on production machines for machining said parts and machining time therefor into a format suitable for use by said production scheduling system to allow said production scheduling system to form schedule plans for said given period of time and for transmitting said converted data to said production scheduling system; and
   means, when an appropriate workload balance on a production line connected upstream from said automatic production line control data forming system has been reached, for converting said data on production machines for machining parts to a format suitable to allow said automatic programming system to form said programs.

5. An automatic production line control data forming system for use in a production, design, control and preparation system for a production line, said system comprising:
   a process planning system for inputting an article producing plan including first data representing kinds, numbers and delivery dates of parts to be manufactured during a given period and second data on production machines for machining said parts and machining time therefor and for performing a process planning operation to produce a process plan in accordance with said input article producing plan;
   a production scheduling system for forming a schedule for a given period of time in accordance with said article producing plan and said process plan;
   an automatic programming system for forming programs for production machines and for receiving and converting said first data and said second data into a format suitable for use by said production scheduling system and transmitting said convened first and second data to said production scheduling system to allow said production scheduling system to form schedule plans for said given period of time.

6. The system according to claim 5, wherein said process planning system comprises:
   a drawing inputting section for processing part drawings provided in said article producing plan to form part models;
   a solid modeler for forming three-dimensional configuration dam;
   memory means for storing databases concerning production machines and materials; and
   a process planning expert system, responsive to said part drawings, said configuration dam, and said memory means for determining said process plan.

7. The system according to claim 5, wherein said production machines comprise numerical controlled machine tools and robots.

8. The system according to claim 5, wherein said article producing plan comprises data representing configurations and tolerances provided on drawings of articles to be produced.

9. The system according to claim 5, further comprising:
   means, when an appropriate balance on a production line connected upstream from said automatic production line control data forming system has been reached, for converting said data on production machines for machining pans to a format suitable to allow said automatic programming system to form said programs.

* * * * *